United States Patent
Hamalainen et al.

(10) Patent No.: US 8,654,719 B2
(45) Date of Patent: Feb. 18, 2014

(54) METHOD FOR SPECTRUM SHARING IN A MULTI-MODE SYSTEM AND RELATED APPARATUS

(75) Inventors: Jyri Kalervo Hamalainen, Oulu (FI); Kari Veikko Horneman, Oulu (FI); Vinh Van Phan, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 352 days.

(21) Appl. No.: 12/740,204

(22) PCT Filed: Sep. 15, 2008

(86) PCT No.: PCT/EP2008/062245
§ 371 (c)(1),
(2), (4) Date: Jul. 1, 2010

(87) PCT Pub. No.: WO2009/056390
PCT Pub. Date: May 7, 2009

(65) Prior Publication Data
US 2010/0272038 A1 Oct. 28, 2010

(30) Foreign Application Priority Data

Oct. 30, 2007 (GB) .................................. 0721307.7

(51) Int. Cl.
*H04W 4/00* (2009.01)
(52) U.S. Cl.
USPC ............................. 370/329; 370/328; 370/332
(58) Field of Classification Search
USPC ........... 455/427, 454, 455; 370/329, 328, 332
See application file for complete search history.

(56) References Cited

U.S. PATENT DOCUMENTS

| 5,412,658 | A  | * | 5/1995  | Arnold et al. ................. 370/330 |
| 7,620,394 | B2 | * | 11/2009 | Good et al. ................... 455/427 |
| 7,636,567 | B2 | * | 12/2009 | Karabinis et al. ............. 455/429 |
| 7,881,726 | B2 | * | 2/2011  | Gurney et al. ................ 455/454 |
| 8,014,464 | B2 | * | 9/2011  | Benjebbour et al. .......... 375/295 |

(Continued)

FOREIGN PATENT DOCUMENTS

| CN | 1533641 A   | 9/2004  |
| EP | 1 085 676 A1 | 3/2001  |
| EP | 1 895 719 A1 | 3/2008  |
| GB | 2 320 399 A | 12/1996 |

OTHER PUBLICATIONS

K. Hooli et al IST-2003-507581 Winner D6.1: "Winner spectrum aspects: methods for efficient sharing, flexible spectrum use and coexistence D6.1" Information Society Technologies, [Online] Oct. 30, 2004, pp. 1-88, XP002528637 Retrieved from the Internet: URL:http://www.ist-winner.org/DeliverableDocuments/D6.1v1.1.pdf> [retrieved on May 19, 2009] cited in the application.

(Continued)

*Primary Examiner* — Huy D Vu
*Assistant Examiner* — Kuo T Chiang
(74) *Attorney, Agent, or Firm* — Harrington & Smith

(57) ABSTRACT

A measurement apparatus comprising means for checking for available radio spectrum resource in a first system in a radio coverage area; means for sending information to a second system indicating the availability of radio spectrum resource of the first system which is usable by said second system in at least part of said radio coverage area, wherein said first system has priority over said radio spectrum resource.

31 Claims, 4 Drawing Sheets

(56) References Cited

U.S. PATENT DOCUMENTS

| | | | |
|---|---|---|---|
| 8,036,676 B2 * | 10/2011 | Okazaki | 455/454 |
| 8,170,576 B2 * | 5/2012 | Wu | 455/454 |
| 2006/0205367 A1 | 9/2006 | Karabinis | 455/95 |

OTHER PUBLICATIONS

Capar F et al: "Analysis of coexistence strategies for cellular and wireless local area networks" 2003 IEEE 58th Vehicular Technology Conference. VTC 2003-Fall (IEEE Cat. No. 03CH37484) IEEE Piscataway, NJ, USA, vol. 3, 2003, pp. 1812-1816 vol., XP002528642 ISBN: 0-7803-7954-3.

Capar F et al: "Comparison of Bandwidth Utilization for Controlled and Uncontrolled Channel Assignment in a Spectrum Pooling System" VTC Spring 2002. IEEE 55th. Vehicular Technology Conference. Proceedings. Birmingham, AL, May 6-9, 2002; [IEEE Vehicular Technolgy Conference], New York, NY : IEEE, US, vol. 3, May 6, 2002, pp. 1069-1073, XP001214458 ISBN: 978-0-7803-7484-3.

Cassioli D et al: "Measurements of the Performance Degradation of UMTS Receivers Due to UWB Emissions" IEEE Communications Letters, IEEE Service Center, Piscataway, NJ, US, vol. 9, No. 5, May 1, 2005, pp. 441-443, XP001229729 ISSN: 1089-7798.

* cited by examiner

METHOD FOR SPECTRUM SHARING IN A MULTI-MODE SYSTEM AND RELATED APPARATUS

FIELD OF THE INVENTION

The present invention relates to measurement apparatus and in particular but not exclusively to apparatus for facilitating spectrum sharing. The present invention also relates to a system and a method.

BACKGROUND OF THE INVENTION

A communication system is a facility which facilitates communication between two or more entities such as communication devices, network entities and other nodes. A communication system may be provided by one or more interconnect networks. It should be appreciated that although a communication system typically comprises at least one communication network, for example a fixed line network, a satellite system, a wireless system or a mobile network, in its simplest form a communication system is provided by two entities communicating which each other. The communication may comprise, for example, communication of data for carrying communications such as voice, electronic mail (email), text messages, multimedia and so on. The user may communicate by means of an appropriate communication device such as user equipment.

An appropriate access system allows the communication device to access the communication system. An access to the communication system may be provided by means of a fixed line or wireless communication interface, or a combination of these. Examples of wireless access systems include cellular access networks, various wireless local area networks (WLANs), wireless personal area networks (WPANs), satellite based communication systems and various combinations of these.

A communications system typically operates in accordance with the standard and/or certain specifications and protocols which set out what the various elements of the system are permitted to do and how that should be achieved. For example, it is typically defined if the user, or more precisely user equipment is provided with a circuit switched bearer or a packet switched bearer or both. Also, the manner in which communication and various aspects thereof should be implemented between the user equipment and the various elements of the communication system and their function and responsibilities are typically defined by a predefined communication protocol.

Reference is made to the following document: IST-2003-507581 WINNER D6.1: WINNER Spectrum Aspects: Methods for Efficient Sharing, Flexible Spectrum Use and Coexistence. This document provides a background to the general concept of flexible spectrum use FSU and spectrum sharing SS in IMT (international mobile telecommunications)-A (advanced) systems.

FSU relates to flexible spectrum use. This refers to the concept of spatially and/or temporarily varying use of the radio spectrum. In other words, in a environment comprising more than one system, there is not an exclusive harmonised spectrum assignment.

Spectrum sharing refers to the situation where different systems or sub-systems utilise the same part of the spectrum in a coordinated or uncoordinated manner. A special case is sharing based on flexible spectrum use.

IMT-Advanced system refers to radio access systems beyond the IMT-2000 system. A global unified wireless architecture is proposed which visualises a hierarchy of interconnected access systems. This system envisages new radio interfaces with mobile class targeting for 100 Mbps and nomadic or local area class targeting for 1 GBPs. This may include operation on new spectrum or frequency bands which may or may not be licensed.

In the International Telecommunication Organization ITU there is under preparation spectrum allocation proposals for IMT-Advanced systems. In that context one proposal has been that the spectrum slots allocated to fixed satellite service (FSS) usage would be allowed a secondary usage for terrestrial wireless systems if the interference levels to a primary satellite system is kept in certain limits. The secondary wireless systems could be a cellular system or wireless local area network.

The interference to a primary satellite system may be severe in the vicinity of an earth station and for that reason it has been proposed that there will be an exclusion zone around an earth station where the secondary usage by a terrestrial system is not permitted or the power levels should be relatively low.

However, there is a problem in that with wireless systems it is difficult to define the exact coverage of a communication area, especially if user equipment is moving. This is means that it may be difficult to define which frequency slots are allowed in which areas and when to permit spectrum sharing.

One proposal is to use a beacon signal in those frequency slots which are allowed for spectrum sharing between a satellite and terrestrial system. In this scheme, devices of the terrestrial system should monitor that beacon. In this proposal, it is unclear as to the responsibility for the transmission of the beacon signal.

Another proposal is to calculate the contributions of different cells to the interference at an earth station. The transmit powers are set a maximum in the individual cells so that the interference remains below an acceptable interference threshold at the earth station.

Yet another proposal is to combine a positioning system with a mapping of the geographical area with allowed frequency slots. In this proposal, earth station locations should be known for the mapping and that is not always possible, especially in the case of temporary earth stations, e.g., moving earth stations provided in news vans such as CNN vans.

It is an aim of embodiments of the present invention to address one or more of the problems set out above.

SUMMARY OF THE INVENTION

According to a first aspect of the present invention, there is provided a measurement apparatus comprising means for checking for available radio spectrum resource in a first system in a radio coverage area; means for sending information to a second system indicating the availability of radio spectrum resource of the first system which is usable by said second system in at least part of said radio coverage area, wherein said first system has priority over said radio spectrum resource.

According to a further aspect of the present invention, there is provided a measurement apparatus comprising; means for checking for available frequency in a first system; and means for sending a message to a second system indicating the available frequency.

According to another aspect of the present invention, there is provided a measurement method comprising checking for available radio spectrum resource in a first system in a radio coverage area; sending information to a second system indicating the availability of radio spectrum resource of the first system which is usable by said second system in at least part of said radio coverage area, wherein said first system has priority over said radio spectrum resource.

According to another aspect of the present invention, there is provided a network entity in a second system; means for receiving a message from a measuring apparatus, said message requesting said network entity to transmit a reference signal; and transmitting said requested reference signal.

According to another aspect of the present invention, there is provided a network entity in a second system, means for receiving information relating to available radio resources of a first system, said first system having priority over said radio resources; and using said information to allocate radio resources for use by said second system.

According to another aspect of the present invention, there is provided a measurement apparatus comprising means for receiving a reference signal from a second system on a radio spectrum resource allocated from a first system to said second system; and means for using said reference signal to determine interference to the first system caused by use of said radio spectrum resource allocated to said second system.

According to another aspect of the present invention, there is provided a measurement apparatus comprising means for monitoring interference in radio spectrum resources allocated from a first system to a second system; and means for transmitting information to said second system if said interference exceeds a predetermined level, said information indicating that said interference exceeds said predetermined level.

According to a further aspect of the present invention, there is provided a method comprising receiving a reference signal from a second system on a radio spectrum resource allocated from a first system to said second system; and using said reference signal to determine interference to the first system caused by use of said radio spectrum resource allocated to said second system.

According to a further aspect of the present invention, there is provided a method comprising monitoring interference in a radio spectrum resource allocated from a first system to a second system; and transmitting information to said second system if said interference exceeds a predetermined level, said information indicating that said interference exceeds said predetermined level.

According to a further aspect of the present invention, there is provided a measurement apparatus comprising means for checking for available radio spectrum resource in a first system in a radio coverage area; means for sending a request to a second system for a reference signal, said reference signal being on said available radio resource; means for receiving said reference signal from said second system on said available radio spectrum resource; means for using said reference signal to determine interference to the first system caused by use of said available radio spectrum resource by said second system; and means for transmitting to said second system information indicating if at least available radio spectrum resource is usable by said second system, According to another aspect of the present invention, there is provided a method comprising checking for available radio spectrum resource in a first system in a radio coverage area; sending a request to a second system for a reference signal, said reference signal being on said available radio resource; receiving said reference signal from said second system on said available radio spectrum resource; using said reference signal to determine interference to the first system caused by use of said available radio spectrum resource by said second system; and transmitting to said second system information indicating if at least available radio spectrum resource is usable by said second system,

BRIEF DESCRIPTION OF DRAWINGS

For a better understanding of the present invention and as to how the same may be carried into effect, reference will now be made by way of example only to the accompanying drawings in which.

DETAILED DESCRIPTION OF PREFERRED EMBODIMENTS. OF THE PRESENT INVENTION

Figure 1:
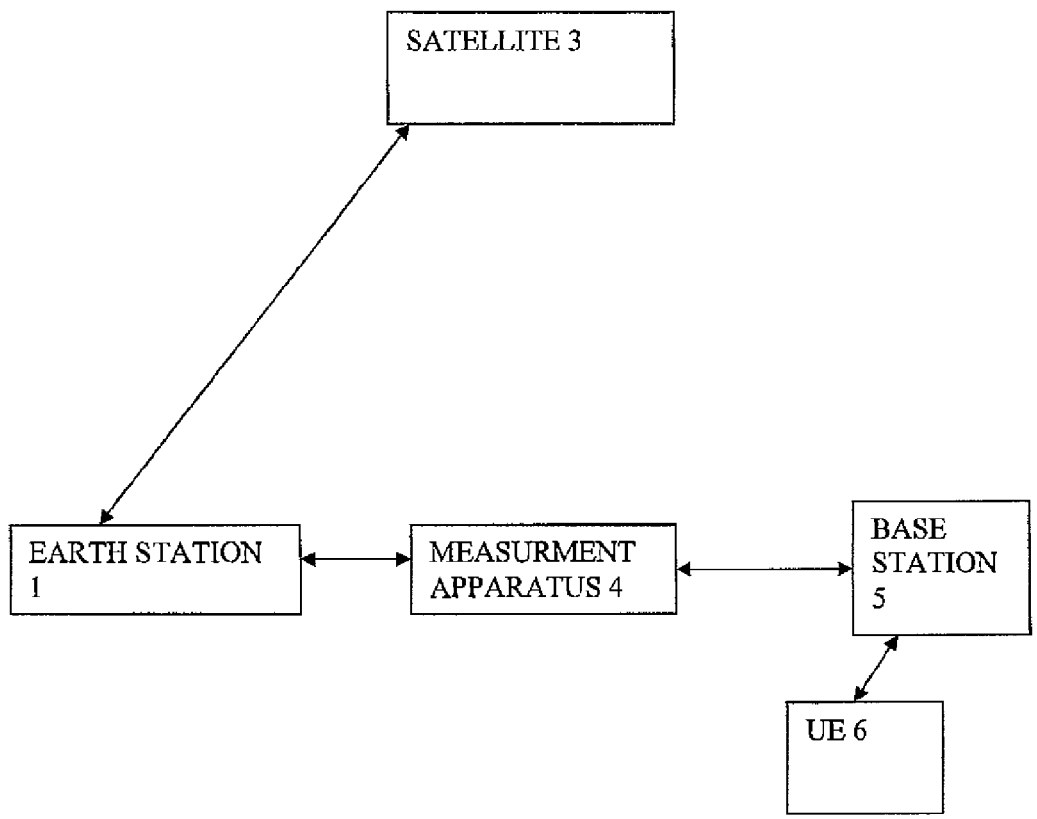
FIG. 1 illustrates schematically a system with which embodiments of the invention may be used.

Reference is made to FIG. 1 which shows a primary satellite system 2 represented schematically by an earth station 1 and a satellite 3. The satellite system may comprise a single satellite or may comprise a plurality of satellites. There may be a single earth station or a plurality of earth stations in the primary satellite system. The earth station may be stationary or capable of moving. The earth station will be capable of sending signals to and/or receiving signals from the satellite.

In FIG. 1, a secondary terrestrial system 7 is represented schematically by a base station 5 and user equipment 6. The secondary terrestrial system is a wireless communication system such as a WLAN or PLMN (public land mobile network) system.

In preferred embodiments of the invention, the primary system will take priority over the secondary system for the spectrum resources which may be shared. In the preferred embodiments, the secondary system is permitted to use the spectrum resources of the primary system which are unused by the primary system. Preferably, but not necessarily, the arrangement is such that spectrum resources will not be taken away from the primary system. In other words the primary system has the first call on the spectrum resources. Only when the primary system has all the resources it requires will any spare resources be allocated to the secondary system.

However in alternative embodiments of the invention, the secondary system may take priority over the spectrum resources. In yet another embodiment of the invention, the primary and secondary systems may have equal priority over the resources to be shared.

In one embodiment of the invention, the primary system and in particular the earth station may be more sensitive to interference than the secondary system. However, this may not be the case in alternative embodiments of the invention.

Also shown in FIG. 1 is a measurement apparatus 4 embodying the invention. This measurement apparatus is placed close to an earth station to measure the interference levels at the earth station. The measurement apparatus 4 should not disturb the primary communication of the satellite system. The apparatus 4 should know what, when and in which direction to measure.

The measurement apparatus 4 is arranged to report the measurement results to the secondary system before the secondary system starts to use frequency slots of the primary system.

The measurement apparatus 4 is capable of scanning the whole frequency range of interest with a predetermined accuracy so that, based on the measurement results, a frequency allocation for the secondary system is possible.

The information exchange between the measurement apparatus 4 and the secondary system is performed on a different frequency band to that used as the primary satellite band so that the measurement apparatus 4 does not disturb the primary communication of the satellite system. In embodiments of the invention, point-to-point or point-to-multipoint transmission may be used in a unicast or multicast manner. Thus the measurement apparatus can communicate with one or more base stations of one (or more) secondary system(s) by using a dedicated point-to-point radio connection established to each involved base stations of the secondary system(s) or using a point-to-multipoint connection established to multiple base stations at the same time. The measurement apparatus is able to receive broadcast system information from different base stations of secondary system.

Thus, the radio connection establishment and the measurement control between the measurement apparatus and the secondary system can be based upon the corresponding procedures of the secondary system.

The content of the exchanged control information between the measurement apparatus may comprise system parameters and constraints designated for facilitating flexible spectrum use (FSU) and spectrum sharing (SS) between the primary and secondary systems by using the measurement apparatus 4. These parameters and constraints will be as required for providing spectrum sharing.

In one embodiment of the invention, the measurement apparatus 4, based on monitoring and measurement results of the surrounding radio environment of interest, can report to the secondary system information such as temporary exclusion-zone dimensioning in terms of, e.g., GPS-compliant coordinates of exclusion-zone in terms of geographical area (especially in the case of temporary or moving earth stations), prohibitive exclusion-zone directions (i.e., related to control of antennas beam-forming), interference levels and transmit-power limits on a spectrum band of interest, and so forth. In other words an exclusion zone around the earth station can be defined. The definition of that exclusion zone may be in any suitable form understandable by the secondary system. The definition may be in terms of GPS coordinates as mentioned above or any other geographical definition such as cell or cell identities or parts of cells. The definition may define a boundary area of the exclusion zone.

It should be appreciated that alternatively or additionally the exclusion zone may vary over time due to for example movement of the satellite, even if the earth station is in a fixed position.

In some embodiments of the invention, the exclusion zone may be required to have a minimum size. In alternative embodiments, the exclusion zone may have no minimum size. Additionally or alternatively the exclusion zone may have a defined maximum size so that the exclusion zone may have a variable size depending on the radio environment but will not exceed that maximum size. In alternative embodiments, the exclusion zone will have no maximum size and can be as large as required.

In one alternative, the definition may be defined additionally or alternatively in terms of control parameters for an entity of the secondary system. For example, the definition may comprise information such as maximum base station power or maximum base station interference. This may also include information on the spectrum which the secondary system can share with the primary system.

Upon reception of such a measurement report, the secondary system shall examine the report and decide what action is required. This may include common- and dedicated control. This means that the resulting control or procedure may be common to all UE (user equipment) a group of UEs in the relevant coverage area of the secondary system (e.g. one or more cells) or dedicated to certain UEs. The action may additionally or alternatively be network reconfiguration if necessary (e.g., switching off several cells in the coverage area of an earth station of the primary system.)

In one modification, the measurement apparatus will decide what action is required by the secondary system and send the instructions to the secondary system.

In one embodiment of the invention, the measurement apparatus is arranged to communicate with a neighbouring base station of the secondary system via a radio or wireless link. The measurement apparatus may communicate with a single base station or with a plurality of base stations. Where communication between is via a radio link, the frequency or frequencies used for that communication will be a frequency or frequency which is not used by the earth station or the satellite when communicating with that earth station.

In one alternative, the measurement apparatus is arranged to communicate with the secondary system via a fixed line connection. That fixed line connection may be with the base station(s) or with another network entity of the secondary system. Thus measurement reports for and requests to the secondary system can be sent through a fixed line connection.

The measurement apparatus 4 may also collect and analyze statistics relating to the primary system activity. Results from this analysis can be used while making measurement reports and requests for the secondary system.

In one alternative, the measurement or monitoring procedure is divided into phases, which may be at least partially done in parallel or in sequence. These phases are illustrated with reference to FIG. 3 and explained with reference to FIG. 2 which shows the measurement apparatus and a base station in more detail.

In a first phase S1 the measurement apparatus scans the whole frequency range to determine the frequency slots used by the primary satellite system. An antenna 200 is controlled by a scanning unit 204 to ensure that the entire frequency range is scanned. This is only one way in which this could be achieved. For example, the antenna can be arranged to receive a number of different frequencies at the same time and the received signals are processed so scan the whole frequency range.

In the second phase S2 the measurement apparatus 4 requests the secondary system to transmit a reference signal such as a pilot signal with a predetermined level in defined frequency slots (related to sharable resources of the primary system). The level of the request signal may be at the level which is receivable by devices in the possible exclusion zone. The antenna passes the received signals to a receiver 206 of the measurement apparatus which processes the signal to reduce the received signals to baseband. The output of the receiver 208 is passed to a determination unit 208 which determines which are the available frequencies. For those determined available frequencies, the determination unit 208 formulates a command for the base station(s) and/or user equipment and passes the command to the transmitter 202 of the measurement apparatus. This command is the request for the pilot signal to be transmitted. The command is converted by the transmitter 202 into a radio frequency signal which can be transmitted by the antenna 200.

This command can be an explicit request of the measurement apparatus and/or an implicit request triggered by an information element or the like and/or constraint sent in the measurement report by the measurement apparatus.

Figure 2:
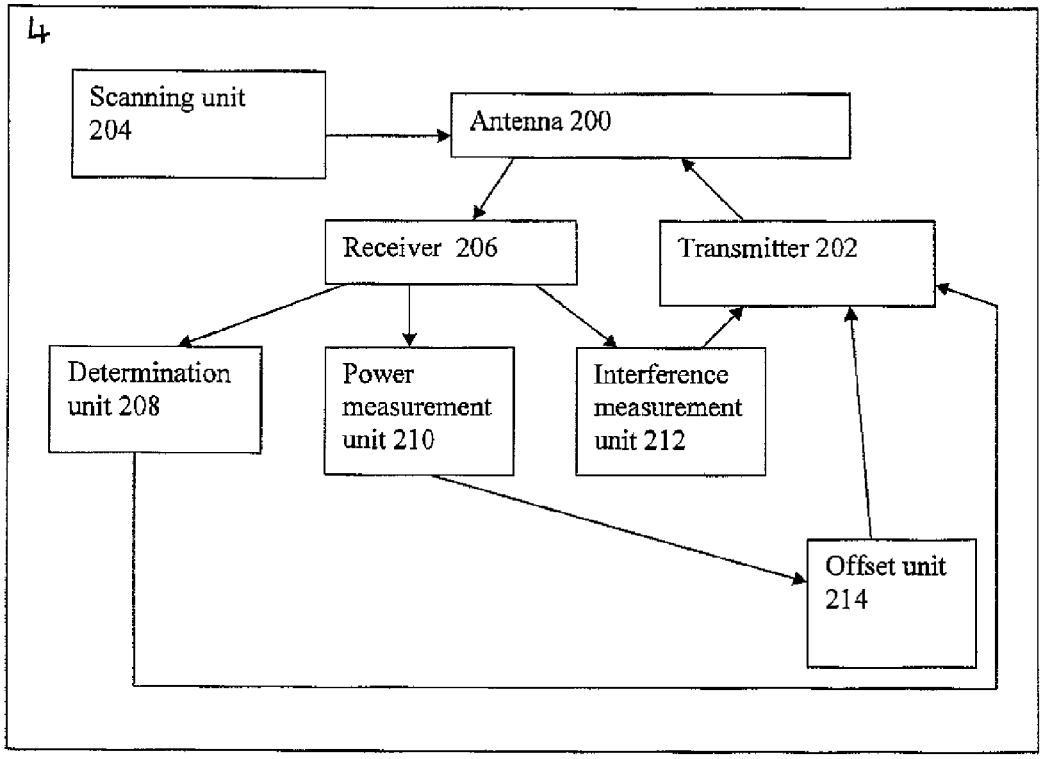
FIG. 2 shows a schematic view of a measuring apparatus and a base station embodying the present invention.
Figure 2:
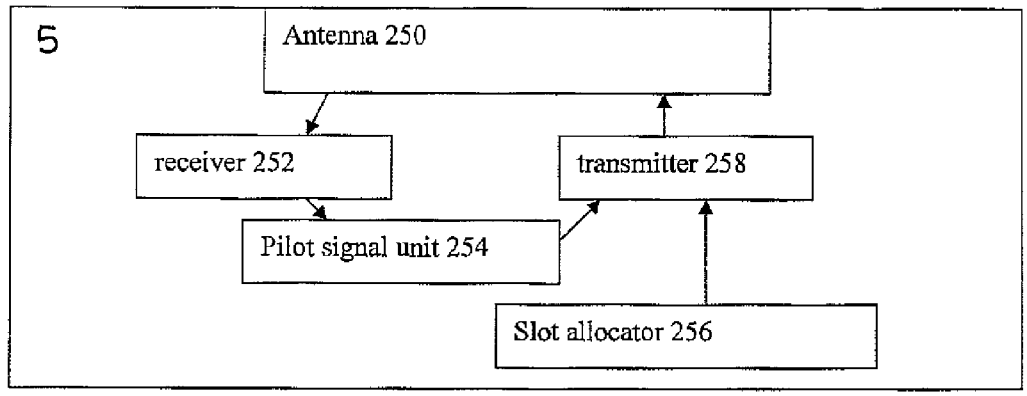

Execution of the request by the secondary system can be implemented by available functions in the network e.g. power control, beamforming, electronic transmit antenna tilting etc. In one embodiment, as illustrated in FIG. 2, the antenna 250 of the base station receives the command signal. The command signal is passed to a receiver 252 which converts the received signal to the baseband. The command is then passed to a pilot signal unit 254 which controls a transmitter 258 to transmit a pilot signal via the antenna 250. The pilot or reference signal will be at an available frequency at an available time slot in one embodiment of the invention.

The user equipment may have a similar arrangement to the base station. In one alternative, the base station will forward the request for a pilot signal to the user equipment. The contrasts to the embodiment of the invention in which the measuring apparatus sends the request for the pilot signal directly to the user equipment.

In a third phase S3, the measurement apparatus 4 measures using a power measurement unit 210 the power levels of the pilot signals received from the secondary system and forms an interference map as a function of direction of arrival of the pilot signals. The power measurement unit 210 receives the signals for analysis form the receiver 206. The measurement apparatus has an offset unit 214 which compares the allowed interference levels and determines the offset for the power levels (i.e. how much head room there is to increase transmission power by entities of the secondary system).

In the fourth phase S4, the measurement apparatus informs the secondary system of the offsets and the secondary system allocates the usable frequency slots for use and advises the measurement apparatus of the allocation. This is done by the offset unit 214 providing a command or message which is passed to the transmitter 202. The transmitter 202 provides a command signal or message signal at radio frequency which is passed to the antenna for transmission to one or more elements of the secondary system. These elements maybe one or more base stations and/or one or more user equipment. The information may be passed by base station and/or user equipment to an upstream control node such a radio network controller or similar entity which uses the information received to control frequency allocation in the secondary system.

In the fifth phase S5, the interference measurement unit 212 of the measurement apparatus measures the interference levels in the allocated frequency slots and informs the secondary system if the interference levels are too high. In response to such advice, the secondary system will change one or more operating parameters to attempt to reduce interference. These parameters may be transmission power or even whether to use an available spectrum or which element of the secondary system uses the available spectrum, or indeed any other suitable parameter. The interference measurement unit 212 formulates a message to this effect which is passed to the transmitter 202 which forms the signal to be transmitted by the antenna 200.

One or more of the determination unit 208, power measurement unit 210, offset unit 214 and interference measurement unit 212 may be implemented by one or more processors. One or more of the units may be provided by one or more integrated circuits.

Figure 3:
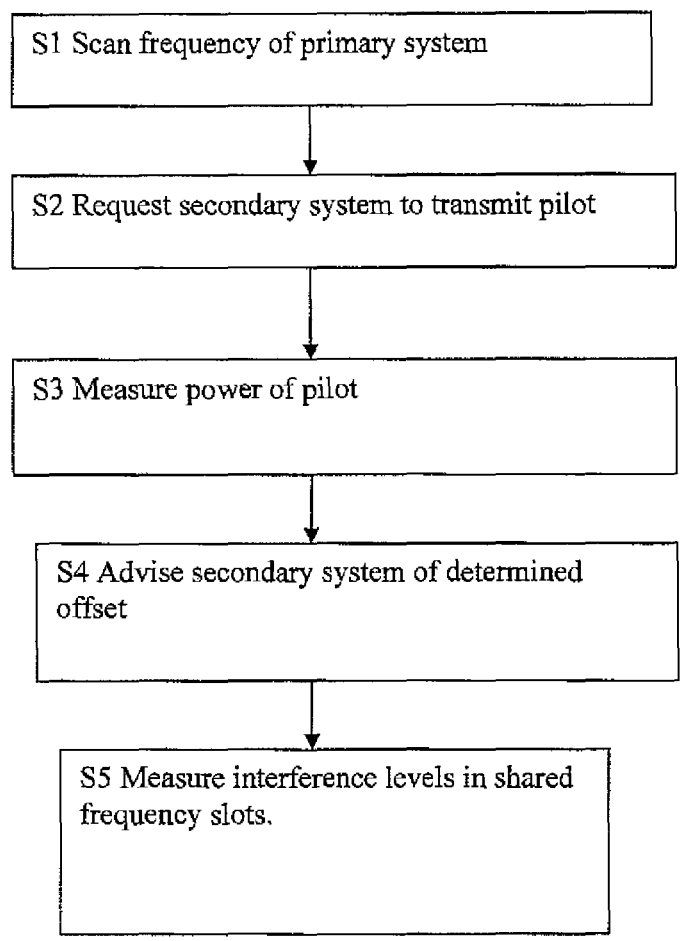
FIG. 3 shows a method embodying the present invention.

The measurement apparatus 4 is arranged to keep track of the primary satellite system usage i.e. the first and fifth phases may be running continuously, in parallel or the phases can be performed as cyclically as indicated in FIG. 3. The other phases may be performed only when there are unallocated frequency slots and may be omitted so that S1 is followed by S5, in the cyclic embodiment.

In one embodiment, the measurement apparatus may be placed in the premises of a satellite earth station or vicinity of it, but is operated by a secondary system.

In an alternative embodiment, the measurement apparatus may also provide an interface for a third party (regulator or government authorities). This interface (implemented through radio or fixed line connection) can be used for various purposes such as system follow-up in case of conflict between primary and secondary system operators. The interface may be a dedicated or shared interface.

The measurement apparatus consists of the parts needed to do the measurements including control and post-processing parts and the parts for the communication with the secondary system, as shown in FIG. 2.

In this embodiment, the secondary system may be able to communicate also in other frequency ranges than those used by the satellite system. However in some embodiments, the secondary system may only be able to use the same frequency range(s) as the primary system.

The access system for the other frequencies, when provided, may be the same as for the secondary communication between the measuring apparatus or it may be another access system such as an existing one such as GSM, UMTS or the like.

The purpose of the pilot signal is to emulate the interference caused by the actual traffic of a secondary system. The power level of the pilot signal may be much lower than the signal levels of the actual traffic, but high enough to enable the reception in the measurement apparatus 4. The pilot signal maybe requested from both base stations and user equipment so that both downlink and uplink traffic are covered. In alternative embodiments, the pilot signal may only be transmitted by one of the base stations and the user equipment.

The level of the request signal determines the coverage of the measurement zone. In preferred embodiments the measurement apparatus knows or can determine the identities of the base stations and terminals served by the base stations near a satellite earth station to enable the measurement apparatus to send the requests in a cyclic manner to the base stations and user equipment. The base stations and user equipment should send the pilot signal at different time instances which makes it easier to detect and separate the received pilots at the measurement apparatus. That enables also the apparatus to report the measurement results to the right base stations (it is assumed that a base station or access node is controlling the traffic in a secondary system). In some embodiments of the invention, the request for a pilot is sent with information as to when the pilot is to be transmitted. It should be appreciated that the pilot will be at a frequency of the primary system which is available.

In one alternative embodiment the measurement apparatus is capable of doing the measurements for two or more secondary networks with the same technology or different technology.

In some embodiments of the invention, the antenna 200 of the measurement apparatus 4 comprises an antenna array. The measurements are performed in conjunction with the antenna array so that the direction of arrival of the pilot signal can be determined. The apparatus may be capable of measuring a 360 degree sector with a predetermined accuracy. In some embodiments of the invention, the direction of the primary satellite communication may vary as the earth station follows the communicating satellite, so the allowed interference levels may change spatially. In such a scenario it is desirable to map the spatial variations of the emulated interference.

The measurement apparatus compares the received pilot signal power levels with an allowed interference map and calculates the offsets to the limits. In this stage, the apparatus may also identify from which source the pilot signals are coming. This may be useful particularly if there are several secondary networks operating at the same time in one direction where there could be several sources which should be taken into account when informing the secondary systems of the offsets.

In one embodiment, predetermined rules are provided as to how the allowed interference margins are shared between user traffic in one network or between networks. This may be implemented by a look up table, an algorithm or the like.

The measurement apparatus is arranged to send the information on the offset map to the base stations of secondary networks. As mentioned previously, in the map, there are identified the possible interference sources and allowed power levels. Based on the map a base station can allocate radio resources for downlink and uplink. The base station is also arranged to inform the measurement apparatus on the allocation so that the measurement apparatus is able to do the follow up measurements in the right frequency slots.

The measurement apparatus may be equipped with GPS and may use its position close to a station of the primary system, coupled with possible knowledge of the positions of interference sources such as fixed base stations of the secondary system(s) and path-loss estimations on the received pilot signals for examples, in order to determine the exclusion-zone dimensioning.

Embodiments of the invention have been described in the context of system which uses time slots. However, embodiments of the invention can be used with any other type of resource allocation such as code division multiplexing or the like.

The embodiments described have been in the context of a satellite system as being the primary system and a terrestrial mobile system as being the secondary system. However, it should be appreciated that this is by way of example only and in other embodiments of the invention, different systems may provide the primary and secondary systems. Thus the fixed satellite service system scenario described is only one example of a primary system. Embodiments of the invention are applicable to other primary and secondary systems.

Figure 4:
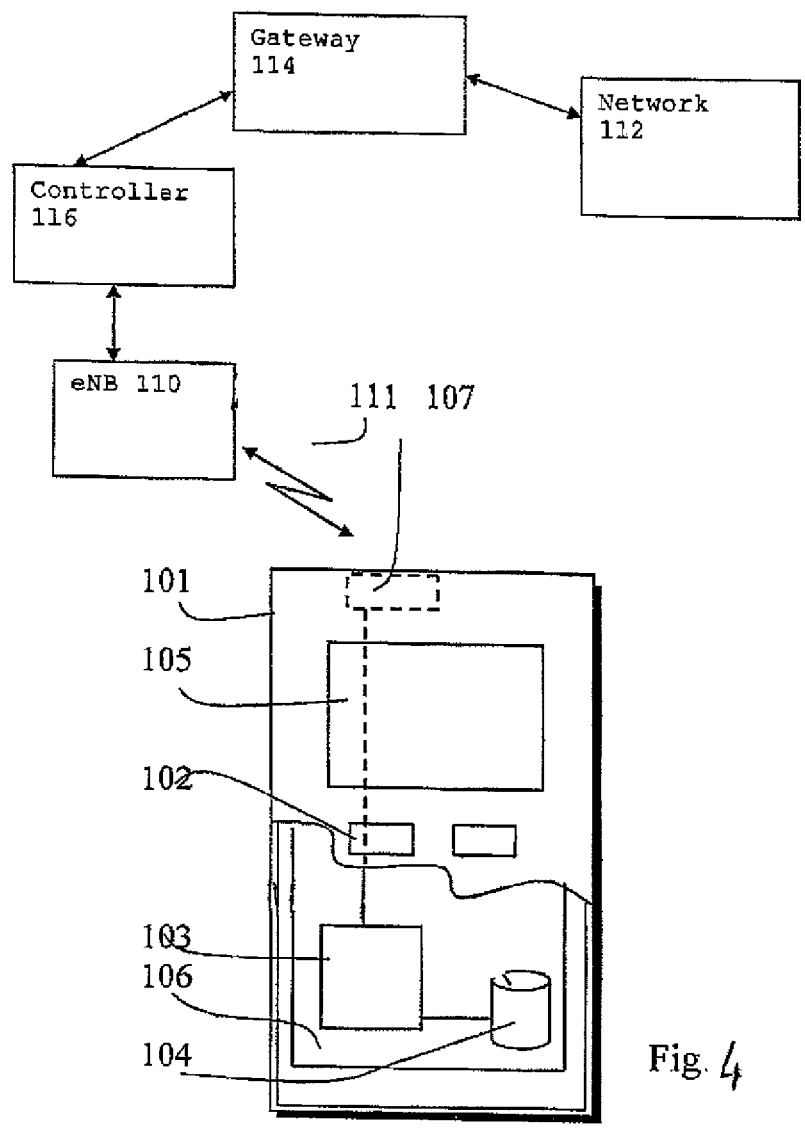
FIG. 4 shows an example of a secondary network with which embodiments of the present invention may be used.

Reference will now be made to FIG. 4 which shows an example of a secondary system. Additionally, with reference to FIG. 4, a brief explanation of the general principals of wireless communications in a system comprising a base station and a communication device such a mobile station will be provided.

In the embodiment of FIG. 4, the system shown is a LTE radio system. As such, the term eNB is used for the base station function. A communication device, for example a user device can be used for accessing various services and/or applications provided by a communication system. In wireless or mobile systems, the access is provided via an access interface between a user device 101 and an appropriate wireless access system. The user device can typically access wirelessly the communication system via at least one base station (eNB) 110.

The eNB 110 can be connected to another system, for example a data network 112, A gateway function between an eNB and the other network can be provided by means of any appropriate gateway node 114, for example a packet data gateway and/or an access gateway. The eNB is typically controlled by at least one appropriate controller entity 116. The controller entity can be provided for managing of the overall operation of the eNB and communications via the eNB. The controller entity 116 is typically with memory capacity and at least one data processor. Functional entities may be provided in the controller by means of a data processing capability thereof.

It should be appreciated that FIG. 4 shows an example architecture only to give an example of a possible secondary communication system where the embodiments described may be provided. It should be appreciated that other arrangements and architectures are also possible. This architecture may form the basis for example of the primary system.

The user device 101 can be used for various tasks such as making and receiving phone calls, for receiving and sending data from and to a data network and for experiencing, for example multimedia or other content. For example, a user device may access data applications provided by a data network. The various applications may be offered in a data network based on the internet protocol (IP) or any other appropriate protocol.

An appropriate user device may be provided by any device capable of sending and receiving radio signals. Non-limiting examples include a mobile telephone, a mobile station, a portable computer provided with a wireless interface card or other wireless interface facility, a personal data assistant provided with wireless communication capabilities or any combination of these or the like.

The user device may communicate via an appropriate radio interface arrangement of the mobile device. The interface arrangement may be provided for example by means of a radio part 107 and associated antenna arrangement. The antenna arrangement may be arranged internally or externally to the mobile device. The mobile device is typically provided with at least data processing entity 103 and at least one memory 104 for use in the tasks that it is designed to perform. The data processing and storage entities can be provided on an appropriate circuit board, in an integrated circuit or in chip set. This is denoted diagrammatically by reference 106.

The user can control operation of the mobile device by means of a suitable user interface such as a keypad 102, voice command, touch-sensitive screen or pad, combination thereof or the like. A display 105, a speaker and a microphone are also typically provided. Furthermore, the mobile device may comprise appropriate connectors (either wired or wireless) to other devices and/or for connecting external accessories such as hand-free equipment.

It should be appreciated that aspects of the embodiments of the present invention can be implemented at least partially in software. Accordingly, embodiments of the present invention may be partially implemented by a computer program when executed by a suitable processor or the like.

It is also noted herein that whilst the above-described exemplifying embodiments of the invention have been described, there are several variations or modifications which may be made to the disclosed arrangements without parting from the scope of the present invention.

The invention claimed is:

1. An apparatus comprising:
at least one processor;
at least one memory including computer program code;
the at least one memory and the computer program code configured, with the at least one processor, to cause the apparatus to perform at least:
checking for available radio spectrum resources in a first system in a radio coverage area;
sending information to a second system indicating the availability of radio spectrum resources of the first system which is usable by said second system in at least part of said radio coverage area and sending a message to said second system requesting at least one entity of said second system to transmit a reference signal on an available frequency;

receiving one or more said reference signals from said second system on said available frequency;

comparing one or more received reference signal power levels with a map of allowed interference limits;

calculating one or more offsets to the allowed interference limits to generate an offset map;

sending the offset map to one or more base stations of the second system such that, based on the offset map, the one or more base stations allocate radio resources for downlink and uplink:

wherein said first system has priority over said radio spectrum resources; and wherein said apparatus is configured to determine interference information for defining an exclusion zone around an entity of said first system.

2. An apparatus as claimed in claim 1, wherein said information further comprises information indicating in which part of said radio coverage area said second system can use said available radio spectrum resources.

3. An apparatus as claimed in claim 1, wherein said information further comprises transmission power information.

4. An apparatus as claimed in claim 1, wherein said information further comprises traffic level information.

5. An apparatus as claimed in claim 1, wherein said information further comprises exclusion zone information indication an area of said radio coverage area in which said second system is prohibited from using said available radio spectrum resources.

6. An apparatus as claimed in claim 1, wherein said checking further comprises scanning through the frequencies of said first system.

7. An apparatus as claimed in claim 1, wherein said reference signal comprises a pilot signal.

8. An apparatus as claimed in claim 1, wherein the at least one memory and the computer program code is further configured, with the at least one processor, to cause the apparatus to perform receiving said reference signal and determining interference information from said received reference signal.

9. An apparatus as claimed in claim 1, wherein said interference information comprises power level information.

10. An apparatus as claimed in claim 8, wherein the at least one memory and the computer program code is further configured, with the at least one processor, to cause the apparatus to perform using said interference information to determine power levels for said second system.

11. An apparatus as claimed in claim 1 wherein said apparatus is configured to determine the map of allowed interference limits.

12. An apparatus as claimed in claim 1, wherein said sending further comprises sending said message on a frequency not used by said first system.

13. An apparatus as claimed in claim 1, wherein the at least one memory and the computer program code is further configured, with the at least one processor, to cause the apparatus to perform measuring interference between said first and second systems.

14. An apparatus as claimed in claim 13, wherein said measuring further comprises measuring the interference at a frequency used by said second system, said frequency having been indicated as an available frequency of said available radio spectrum resources.

15. An apparatus as claimed in claim 1, wherein said first system comprises a satellite system.

16. An apparatus as claimed in claim 15, wherein said checking further comprises checking for available radio spectrum resources associated with an earth station of said satellite system.

17. An apparatus as claimed in claim 1, wherein said second system is a terrestrial system.

18. A measurement method comprising:

checking for available radio spectrum resources in a first system in a radio coverage area;

sending information to a second system indicating the availability of radio spectrum resources of the first system which is usable by said second system in at least part of said radio coverage area and sending a message to said second system requesting at least one entity of said second system to transmit a reference signal on an available frequency;

receiving said reference signal from said second system on said available frequency;

comparing one or more received reference signal power levels with a map of allowed interference limits;

calculating one or more offsets to the allowed interference limits to generate an offset map;

sending the offset map to one or more base stations of the second system such that based on the offset map, the one or more base stations allocate radio resources for downlink and uplink; and determining interference information for defining an exclusion zone around an entity of said first system;

wherein said first system has priority over said available radio spectrum resources.

19. A method as claimed in claim 18, wherein said information comprises one or more of: information indicating in which part of said radio coverage area said second system can use said available radio spectrum resources; transmission power information; traffic level information; and exclusion zone information indication an area of said radio coverage area in which said second system is prohibited from using said available radio spectrum resources.

20. A method as claimed in claim 18, comprising scanning through the frequencies of said first system.

21. A method as claimed in claim 18, comprising receiving said reference signal and determining interference information from said received reference signal.

22. A method as claimed in claim 21, comprising using said interference information to determine power levels for said second system.

23. A method as claimed in claim 18, comprising sending said information and/or said on a frequency not used by said first system.

24. A method as claimed in claim 18, comprising measuring interference between said first and second systems.

25. A method as claimed in claim 18, comprising measuring the interference at a frequency used by said second system, said frequency having been indicated as an available frequency of said available radio spectrum resources.

26. A method as claimed in claim 18, comprising checking for available radio spectrum resources associated with an earth station of a satellite system, said satellite system comprising the first system.

27. A network entity in a second system, the network entity comprising:

at least one processor;

at least one memory including computer program code;

the at least one memory and the computer program code configured, with the at least one processor, to cause the network entity to perform at least:

receiving a message from a measuring apparatus, said message requesting said network entity to transmit a reference signal;

transmitting said requested reference signal; wherein said reference signal includes interference information for defining an exclusion zone around an entity of a first system;
receiving an offset map from the measuring apparatus; and
allocating, based on the offset map, radio resources for downlink and uplink;
wherein the offset map has been generated by comparing one or more received reference signal power levels with a map of allowed interference limits and calculating one or more offsets to the allowed interference limits; and
wherein said first system has priority over said radio spectrum resources.

28. The network entity of claim 27 wherein the at least one memory and the computer program code are further configured, with the at least one processor, to cause the network entity to perform at least: in the second system, receiving information relating to available radio resources of the first system, said first system having priority over said radio resources; and using said information to allocate radio resources for use by said second system.

29. A measurement apparatus comprising:
at least one processor;
at least one memory including computer program code;
the at least one memory and the computer program code configured, with the at leak one processor, to cause the measurement apparatus to perform at least:
checking for available radio spectrum resource in a first system in a radio coverage area;
sending a request to a second system for a reference signal, said reference signal being on said available radio resource;
receiving said reference signal from said second system on said available radio spectrum resource;
using said reference signal to determine interference to the first system caused by use of said available radio spectrum resource by said second system by comparing one or more received reference signal power levels with a map of allowed interference limits, calculating one or more offsets to the allowed interference limits to generate an offset map; and sending the offset map to one or more base stations of the secondary system such that, based on the offset map, the one or more base stations allocate radio resources for downlink and uplink; and
transmitting to said second system information indicating if at least, available radio spectrum resource is usable by said second system.

30. A method comprising:
checking for available radio spectrum resource in a first system in a radio coverage area;
sending a request to a second system for a reference signal, said reference signal being on said available radio resource;
receiving said reference signal from said second system on said available radio spectrum resource;
using said reference signal to determine interference to the first system caused by use of said available radio spectrum resource by said second system by comparing one or more received reference signal power levels with a map of allowed interference limits, calculating one or more offsets to the allowed interference limits to generate an offset map; and sending the offset map to one or more base stations of the secondary system such that, based on the offset map, the one or more base stations allocate radio resources for downlink and uplink; and
transmitting to said second system information indicating if at least available radio spectrum resource is usable by said second system.

31. A computer program stored on a non-transitory computer readable medium and comprising program code arranged to perform the steps of claim 18 when the program is run.

* * * * *

UNITED STATES PATENT AND TRADEMARK OFFICE
CERTIFICATE OF CORRECTION

| | | |
|---|---|---|
| PATENT NO. | : 8,654,719 B2 | Page 1 of 1 |
| APPLICATION NO. | : 12/740204 | |
| DATED | : February 18, 2014 | |
| INVENTOR(S) | : Hamalainen et al. | |

It is certified that error appears in the above-identified patent and that said Letters Patent is hereby corrected as shown below:

In the Claims

In Claim 29:
Column 13, line 26, "leak" should be deleted and --least-- should be inserted.

Signed and Sealed this
Twenty-seventh Day of May, 2014

Michelle K. Lee
*Deputy Director of the United States Patent and Trademark Office*